Patented Sept. 25, 1934

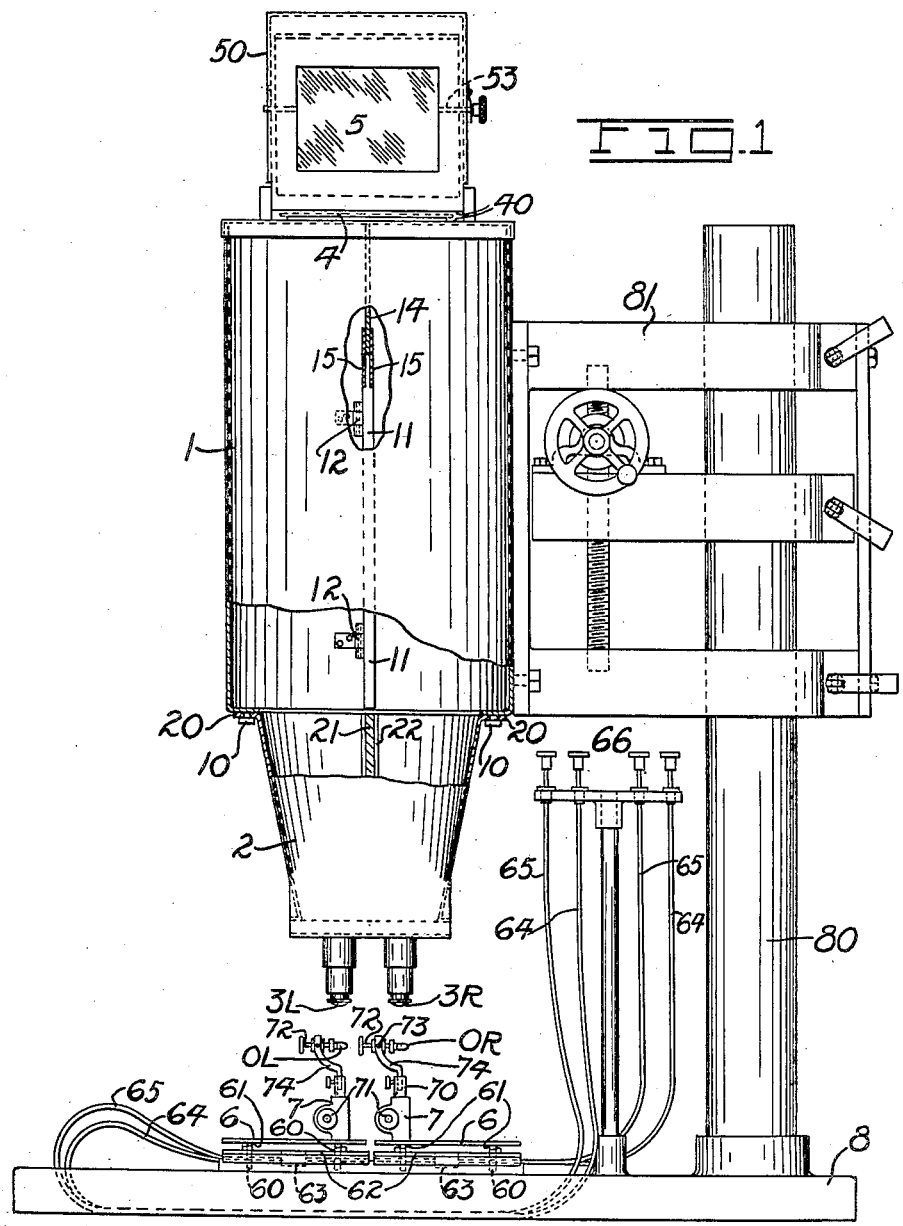

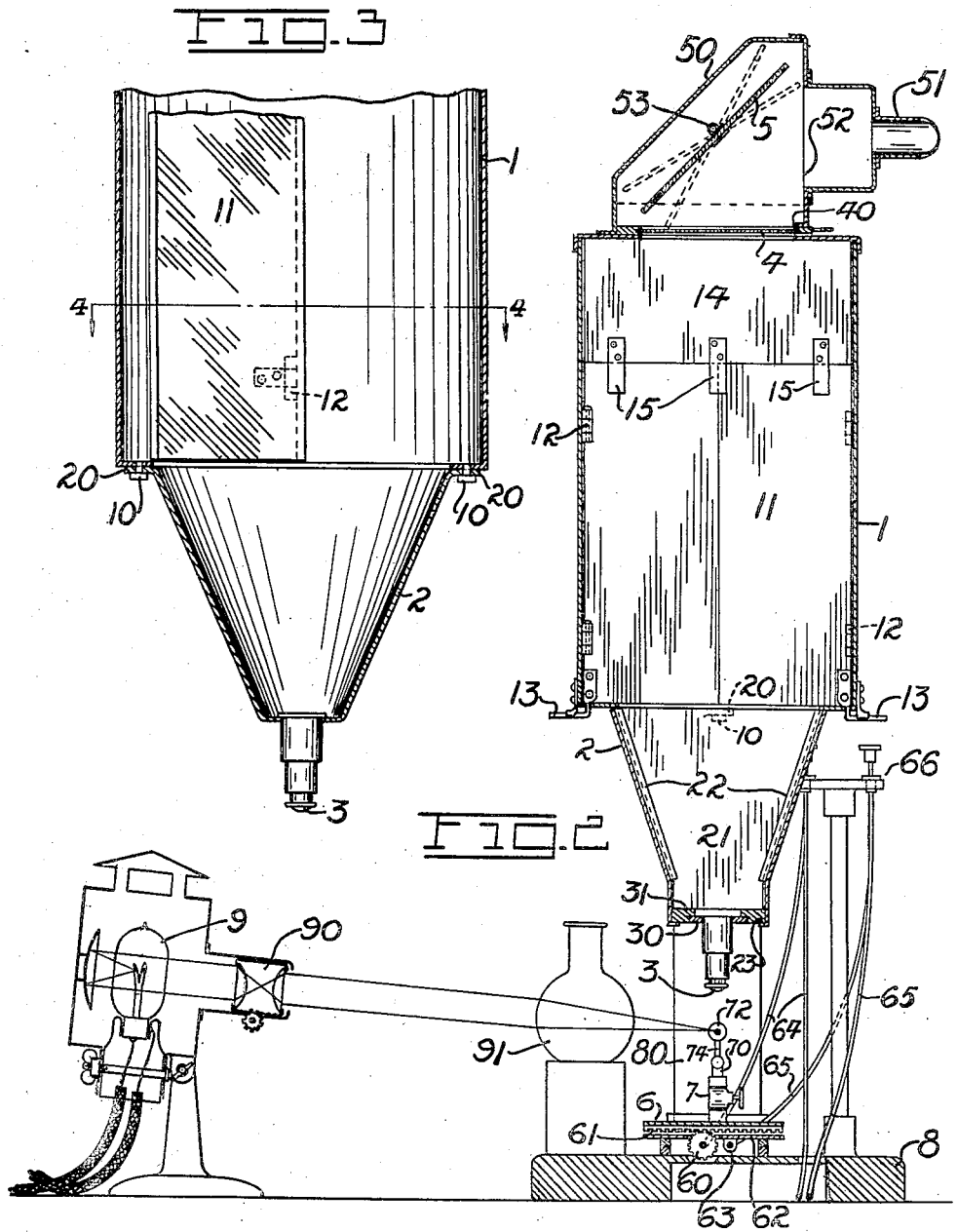

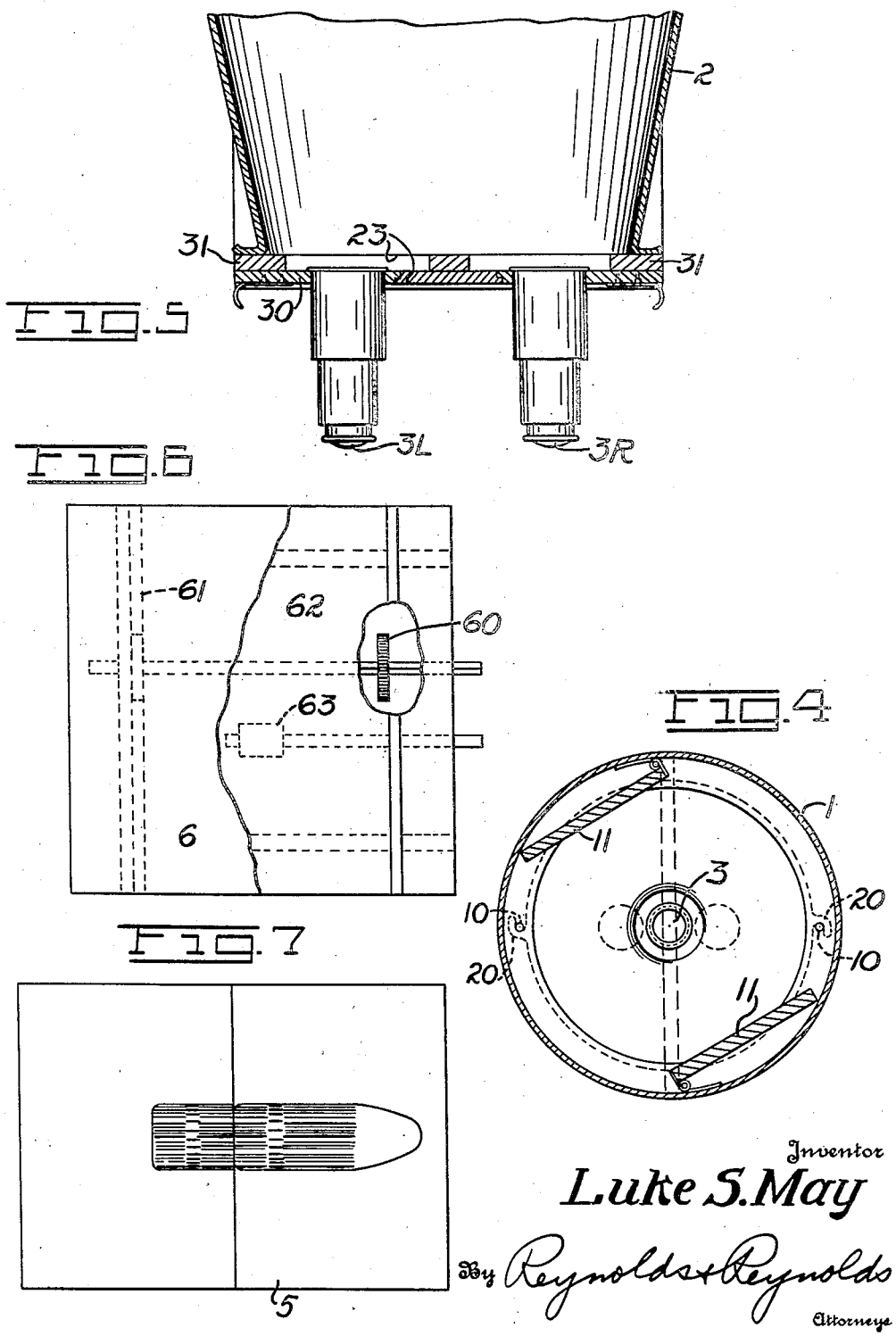

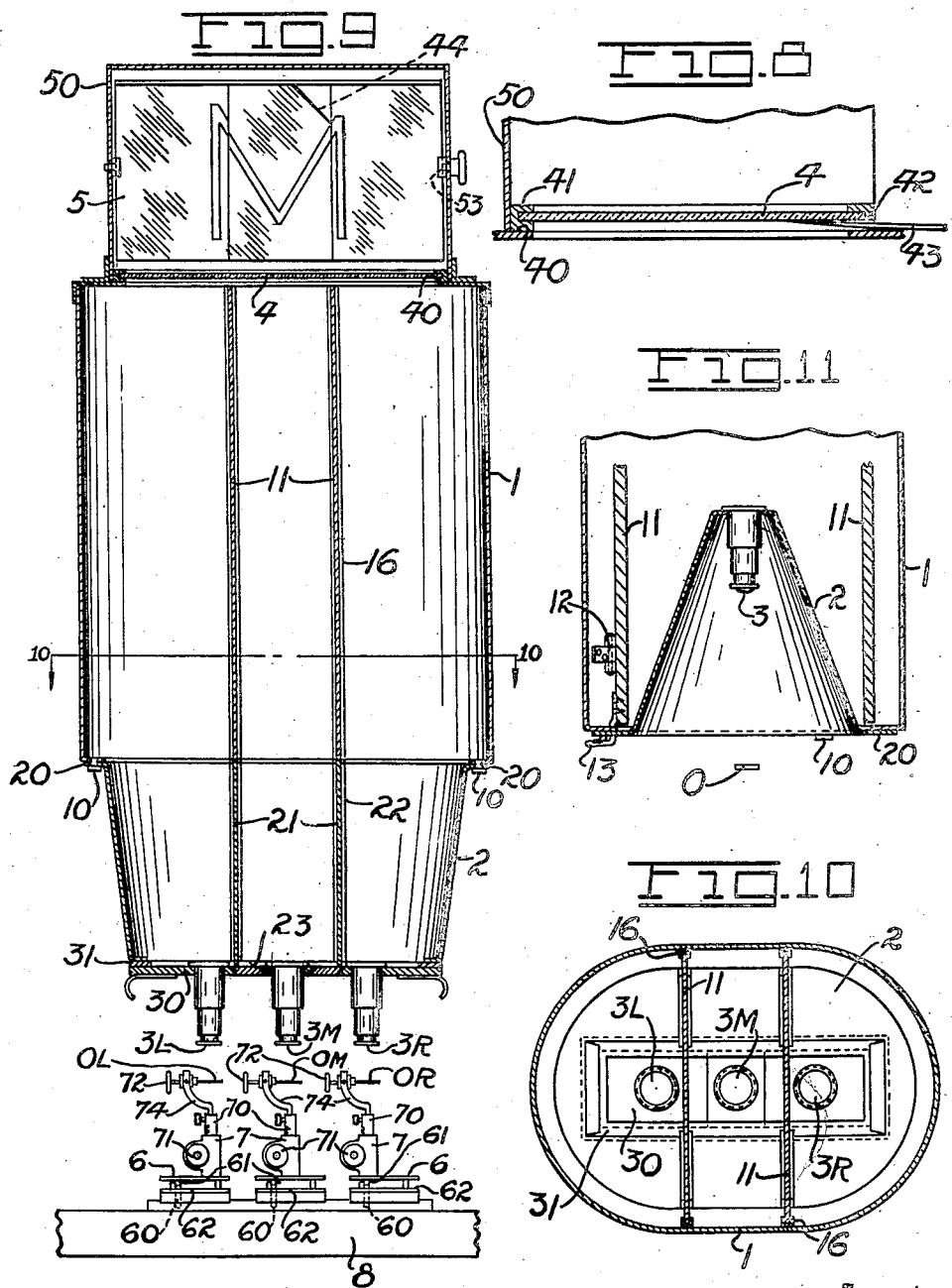

1,974,654

UNITED STATES PATENT OFFICE 1,974,654

COMPARISON MAGNASCOPE

Luke S. May, Seattle, Wash.

Application April 15, 1929, Serial No. 355,201

33 Claims. (Cl. 88—24)

My invention relates to what I term a magnascope, that is, an instrument to enable visual inspection of enlarged images of small objects.

While my device may be put to many and varied uses, it will be of particular importance in the study and comparison of bits of physical evidence to be introduced in court, and in the production of photographs, by the employment of which such comparisons can be made of record. For instance, in homicide cases the question of guilt or innocence often turns on whether or not the fatal bullet was fired from a given firearm, or from one of several suspected firearms. By the use of my instrument, the bullet in question can be visually compared with another bullet fired from the suspected firearm, or from two or more firearms, any one of which might have been used, and thus, by visual comparison of the distinctive marks which are characteristic of each firearm, and which are due to the presence of small burrs, grooves, or irregularities in the barrel of a given firearm, it can be exactly determined, with scientific accuracy, and legally convincing, whether or not the bullet in question was fired from the given firearm. Further, this comparison can be reduced to a photographic reproduction, which can be introduced in court as a matter of record, on an enlarged scale, and which will be self-evident to whoever inspects it, for instance, an appellate court. It may similarly be used for comparison of two specimens of typing, or of writing, and for various small objects which may bear distinctive but microscopic marks, and which can be compared with other such distinctive marks.

While there have been employed heretofore such devices as comparison microscopes, by means of which one may compare the enlarged images of at least two objects, this type of comparison is extremely tedious and wearing, and straining upon the eyes. It is difficult thus to compare two objects through an eyepiece, when the other eye must of necessity be closed or hooded. One of my objects, then, is to provide means for inspecting one or more objects on an enlarged scale, or to compare two or several objects, all similarly enlarged, and all thrown upon a screen side by side, without the necessity of using an eyepiece or any other means which will involve any eye strain, but to provide means whereby such inspections and comparisons can be made with the normal vision of the two eyes.

It is a further object to provide such a device which can be used in the delivery of lectures, as to a class, enabling the entire class to see the objects, and to note the comparisons.

So far as I am aware, comparison microscopes heretofore employed have permitted the comparison of two objects, but not of more than two. It is an object of my invention, therefore, to enable the comparison of three or more objects, as may be desired.

It is a further object of my invention to enable visual comparison of such images, whether one, two, or more, on an enlarged scale, and the photographing of this object or these objects, all simultaneously if there are more than one, by a simple substitution of a photographic plate for the screen upon which the images are projected.

It is a further object to provide an instrument of the type indicated, wherein one may compare two or more objects, side by side, or by means of which one may in effect superimpose or blend related portions of the images of one upon the other to facilitate comparison of markings appearing thereon, and to allow such images to be placed in juxtaposition or apposition.

A further object is the improvement and simplification of the means of control and adjustment of the objects to be compared.

Other objects, and particularly such as refer to mechanical details of arrangement, will be understood from a study of the attached drawings, of this specification, and of the claims which terminate the same.

My invention comprises the novel parts, and the novel combination and arrangement thereof, as is illustrated in the accompanying drawings, described in the specification, and as is more particularly defined by the claims which terminate the same.

In the accompanying drawings I have shown my invention in various forms embodying the principles thereof, and as now preferred by me.

Figure 1 is a front side elevation of a magnascope employing two objective lenses, parts being broken away to show the interior construction.

Figure 2 is a transverse section, on a vertical plane, of the same instrument.

Figure 3 is a similar view of the lower end of a modified form of the instrument, showing a partition swung back, and Figure 4 is a transverse section on a horizontal plane taken on the line 4—4 of Figure 3.

Figure 5 is a vertical sectional view on a plane at right angles to the showing of Figure 2, and illustrating the lens board and supports.

Figure 6 is a plan view, with parts broken away, of an object supporting platform.

Figure 7 is an illustration of the manner in which the images of two bullets may be compared upon the screen.

Figure 8 is a vertical section of a detail of the screen support, illustrating how certain portions thereof may be particularly pointed out, as in the course of a lecture.

Figure 9 is a vertical sectional view through a modified form, arranged for the comparison of three objects, as three typed or printed letters.

Figure 10 is a horizontal sectional view on the line 10—10 of Figure 9.

Figure 11 is a section illustrating the employment of a modified style of nosepiece.

In general, my invention involves the employment of a barrel 1, generally vertically disposed, and generaly having a removable nosepiece 2 fitted to one end thereof, as to the lower end, for example, the nosepiece having supports by means of which two objective lenses 3 are supported, and the barrel having at its upper end a translucent screen 4 for the fixing of images projected upward from the lenses 3. The lenses may be designated 3L and 3R, to distinguish them, though they should be of identical characteristics. Such a barrel would normally rise to a height of several feet (although it might be made considerably shorter or longer, as might be desired), and since it would have to be spaced somewhat above the floor, it would be a trifle inconvenient to have to lean over to view the screen 4, and therefore it is my plan to employ a mirror 5, supported in a hood 50, above the screen 4, by means of which the image may be viewed as thrown from the screen 4 upon the mirror 5, and reflected therefrom in a lateral direction. The hood 50 is, of course, purely a convenience to eliminate outside light which might otherwise fall upon and tend to obscure the image in the mirror 5, and if further protection is needed an eyeshield 51, as indicated best in Figure 2, may be employed. The eyeshield, or even the hood, may be omitted, if light conditions are favorable. The mirror 5 may be mounted upon a horizontal axis 53, by means of which it may be adjusted to direct the image somewhat upward or downward, as may be desired, to accommodate the height of the observer.

While I have referred to an objective lens 3, this is typical of any lens system which might be employed at this point, and the objective, thus considered, may be either a simple, single lens, or any system of compound lenses.

My instrument may be designed to accommodate the inspection of one, two, three, or even more objects, and to accomplish this object it is preferable that the nosepiece 2 be removably secured, and that independent nosepieces be used, one when it is intended to view a single object, and others for viewing two, three, or more objects. The same result might be accomplished by removing or adding extra lenses, but it has seemed preferable in practice to substitute nosepieces, rather than lenses, since the partitions required to separate light from the several lenses can be built into nosepieces especially adapted for a given number of objective lenses. Thus, for example, in Figure 1, the nosepiece 2 is shown as supporting the two lenses 3L and 3R. The nosepiece is detachably secured to the lower end of the barrel, as by the provision of slotted ears 20 (see Figure 4) engageable with headed pins 10 depending from the barrel 1. Each of the several nosepieces to fit upon the single barrel being thus provided with slotted ears, it is but the work of a moment to detach one nosepiece and to attach another. The nosepieces may be interiorly partitioned, as by the partitions 21, interposed between the axes of the lenses, and these may be permanent or removable. Thus, in Figures 1, 2, and 9 these partitions are shown as removably supported in channels 22 in the interior of the nosepiece.

While Figures 3 and 4 illustrate a nosepiece having a single objective lens 3, and show how the partitions 11 may be swung aside to leave the axis of the barrel clear, Figure 4 indicates in dotted lines how a nosepiece with two objectives may be substituted therefor, and how the partitions 11 would then be positioned. Figure 11 illustrates an inverted nosepiece which may be employed if it is desired to use lenses of longer focal length, and to photograph objects therewith in their natural size.

The lenses 3 are, of course, axially adjustable to focus properly upon the screen 4, but ordinarily this adjustment would be determined initially, and there would then be no further adjustment, but the nosepieces, when properly secured to the barrel, would bring the lenses into proper focus, as already set. However, it is desirable that the lenses, whose axes are parallel, may be made to approach each other or separate, along lines normal to their axes, thus to throw selected parts of the images upon the screen closer together or farther apart. To accomplish this the lenses may be directly supported upon lens plates 30, laterally slidable in a lens board 31, each lens plate 30 being slidable independently of the others, and the lens board 31 being receivable in a transverse guide 23 of the nosepiece (see Figures 2, 5 and 9). It is of course essential that proper means be provided to prevent the formation of any apertures which might admit extraneous light. Such means are common in the camera art.

The purpose of the partitions 21, when employed, is, as already stated, to separate the light from the several lenses, and consequently to separate the images projected upon the screen 4. However, it is necessary to provide partitions of the same sort extending substantially to the screen, if the separation is to be made complete. It is of course desirable to overlap the images at times, but it is also desirable to provide two sharply separated images upon the screen side by side, as is indicated in Figure 7, and to enable such sharply separated images to be projected it is necessary to form thin extensions of the partition 21 throughout the barrel 1. This may be accomplished in various ways, and the partitions 11 are indicative of various types of partitions which may be employed. In Figures 1, 2, 3 and 4 the partitions 11 are indicated as permanently supported within the barrel 1, being hinged at 12 at one side of the barrel, and being controlled for swinging movement into registry with the partitions 21 by arms 13 outside of the barrel. These partitions, if of some little thickness, should be brought down to a thin edge at the top at least, and for this purpose it may be desirable to provide a thin auxiliary partition 14, of some sheet material, supported upon the edge of the partition or partitions 11 by clips 15, or the like, which straddle the upper edge of the partitions 11, the partition 14 being inserted by raising the screen 4 and the upper portion of the barrel 1. However, it may be found more convenient to insert the partitions 11 either from above, sliding in guides 16, as indicated in Figures 10 and 11, or by inserting them through the side of the barrel. It will be noted that the only essential in connection with these partitions is that they are in registry with the partitions 21, and effectually separate the light from the several lenses.

It is essential that the screen 4 or the photographic plate which replaces it be exactly positioned with respect to the lenses 3. For this purpose the hood 50, or the upper portion of the barrel 1, may be provided with a guide 40, within which the screen may slide. This may consist of nothing more than a ledge, as may be seen in Figure 8, upon which the screen or its frame 41 rests. The screen 4 is interchangeable with a photographic plate or film and holder, so that when an image or images have been properly focused and adjusted to position upon the screen 4 the latter may be removed and a photographic plate or film substituted therefor and exposed, thus reducing the images for comparison to a matter of record. For lecturing, however, it is desirable to be able to point out the various portions of the images as they appear upon the screen, or reflected upon the mirror 5, and for this purpose there may be left a small hole or holes, as indicated at 42, in the frame of the screen, and through this may be inserted a pin or like pointer, indicated at 43, which may be moved over the face of the screen, to bear upon selected portions of the image to draw particular attention to these portions. The image of such a pointer is indicated at 44 in Figure 9.

The same principle may be employed for the showing of a measure, or of a means of comparison. Thus, a rule may be laid alongside each, or any selected image, or a pair of calipers, whereby distances may be exactly measured, or at least compared.

It is preferable that adjustment be made, so far as possible, in the supports for the objects to be viewed, rather than by adjustment of the barrel or associated parts, and to this end I have shown platforms 6, which are adjustable both transversely and longitudinally, upon which stands 7 may be supported, which provide for vertical and rotative adjustment of the objects. For instance, the transverse adjustment of the platform 6 may be accomplished by a rack pinion 60 meshing with a rack 61 upon the platform 6, the pinion 60 being supported upon a sub-platform 62, which is adjustable by means of a worm and nut indicated at 63. The controls for the pinion 60 and screw 63 may be by means of flexible cables 64 and 65, respectively, running to a control station, generally designated by the numeral 66, within convenient reach of the operator viewing the image in the mirror 5. All of such controls may be concentrated at the one point for the several platforms 6, and any suitable type of control may be substituted for that described.

The stands 7 may comprise a base portion resting upon the platform 6, and adapted to be placed at any position thereon, and a stem 70 vertically adjustable therein, as by means of the adjusting screw 71. The objects OL or OR may be held in the optical axes of the respective lenses 3L and 3R by a pin 72, which is pivoted at 73 for angular adjustment in a vertical plane, and supported from an offset neck 74, which is swiveled in the upper end of the stem 70, and suitably held in position therein. By the offset neck 74 the objects OL or OR may be kept in the axis of the respective lenses 3L or 3R, however the neck may be swiveled in the stem 70, and by the dipping adjustment at 73 a selected portion of an object, such as a mushroomed part of a bullet, may be brought into proper position for inspection without adjustment of its lens to a new focus.

It is of course immaterial how the barrel 1 is supported, but this may conveniently be supported upon a post 80, supported in a solid base 8, a series of bracket arms 81 being secured to the barrel 1, and being vertically adjustable upon the post 8. This support should be of considerable mass, so that it is not disturbed by vibrations.

It is likewise immaterial how the object is illuminated, but in Figure 2 there has been shown a lamp 9 as a source of light, with the usual lens system at 90, and a heat filter and condensing lens at 91. Thus, the object is illuminated from the source 9, and is viewed through the objective lenses 3, and the image is thrown upon the screen 4, to be reflected therefrom by the mirror 5.

In Figure 7 is seen two images side by side. Thus, the butt end of a suspected bullet may be brought into position with relation to the butt end of a bullet known to have been fired from the suspected firearm, and the marks thereon may be shown to coincide, thus indicating with certainty, and with scientific accuracy, that the two bullets were fired from the same piece.

In Figure 9 is seen the comparison of three pieces of typing. The middle specimen corresponds exactly with the right specimen, but does not match with the specimen on the left. Accordingly, the portion in the middle was typed with the same type as that on the right, but was not typed with the same instrument that struck the left specimen. The specimens, thus enlarged, show differences clearly, which might not otherwise be apparent.

It is believed that the manner of employment of the instrument will be obvious, as it has been brought out during the course of the description, and I do not deem it necessary, therefore, to go into further detail in this respect. It furnishes a simple means whereby photomicrographs of several (as three or four) specimens may be simultaneously exposed in a selected relationship one to another, and whereby their images on the screen may likewise be studied. So far as I am aware, it has not been possible heretofore to study more than two objects through a single instrument or eye-piece, and then no comparison photographs could be exposed, nor could any study be made without eye strain.

On the other hand, microscopes of the single or duplex type may be focused in complement with the lens or lenses of my instrument, and easily adjusted into correct position, and the objects studied or photographed through the combined systems. Thus my device is capable of accomplishing results not possible of accomplishment with other devices of which I am aware.

What I claim as my invention is:

1. In combination with the barrel of a magnascope, a plurality of objective lenses supported in one end thereof, means for supporting objects for comparison at the foci of the several objectives, and a screen to receive all the projected images of the several objects, said screen being located at the end of the barrel opposite said lenses.

2. In combination with the barrel of a magnascope, a plurality of objective lenses at one end thereof, means for supporting objects for comparison at the foci of the several objectives, a screen to receive the projected images of the several objects located at the end of the barrel opposite said lenses, and a hooded mirror above said screen to reflect said projected images laterally.

3. In combination with the barrel of a magnascope, a plurality of objective lenses at one end thereof, means for supporting objects for comparison at the foci of the several objectives, a screen to receive the projected images of the several objects located at the end of the barrel opposite said lenses, and a mirror adjustable about a horizontal axis above said screen to reflect said projected images laterally.

4. In combination with the barrel of a magnascope, a plurality of objective lenses supported in one end thereof, means for supporting objects for comparison at the foci of the several objectives, a screen to receive all the projected images of the several objects, said screen being located at the end of the barrel opposite said lenses, and partitions adapted to be positioned at will within said barrel to separate the light rays from the several objectives, or removable to permit the same to overlap.

5. In combination with the barrel of a magnascope, a plurality of objective lenses at one end thereof, means for supporting objects for comparison at the foci of the several objectives, a screen to receive the projected images of the several objects located at the end of the barrel opposite said lenses, partitions adapted to be positioned at will within said barrel to separate the light rays from the several objectives, or removable to permit the same to overlap, and means exterior of the barrel to move said partitions at will.

6. In combination with the barrel of a magnascope, a plurality of objective lenses supported in one end thereof, means for supporting objects for comparison at the foci of the several objectives, slide supporting guides at the end of the barrel opposite the lenses, and a screen and a plate or film holder interchangeably receivable in said guides, for visually focusing the projected images and for subsequently photographing the same.

7. In combination with the barrel of a magnascope, a plurality of objective lenses at one end thereof, means for supporting objects for comparison at the foci of the several objectives, and a screen to receive the projected images of the several objects located at the end of the barrel opposite said lenses, and means supporting said objective lenses for independent lateral adjustment.

8. In combination with the barrel of a magnascope, a plurality of objective lenses at one end thereof, a plurality of object supports, one for each lens, and each universally movable with respect to its lens, and a screen to receive all of the projected images, located at the opposite end of the barrel.

9. In combination with the barrel of a magnascope, a nose-piece removably secured at one end thereof, a single screen at the opposite end, a plurality of object supports, a plurality of objective lenses, each corresponding to one of said object supports, and means supporting all of said lenses in said nose-piece to project images of the several objects side by side upon the screen.

10. In combination with the barrel of a magnascope, a nose-piece removably secured at one end thereof, a screen at the opposite end, a plurality of object supports, a plurality of objective lenses, each corresponding to one of said object supports, means supporting said lenses in said nose-piece to project images of the several objects side by side upon the screen, partitions fixed in said nose-piece between the axes of the several lenses, and partitions movable at will into registry, within the barrel, with the said nose-piece partitions.

11. In combination with the barrel of a magnascope, means for supporting alternatively one or several objective lenses at one end thereof, a translucent screen at the opposite end of the barrel upon which said objective lenses are focused, partition elements hingedly supported within said barrel, on axes parallel to the axis of the barrel, and external means for swinging the partition elements within the barrel to divide it into a plurality of separate light passages, coinciding with the axis of each lens when several are used, or aside to leave one unobstructed light passage, if one lens only is employed.

12. In combination with the barrel of a magnascope, a plurality of objective lenses at one end thereof, means for supporting objects for comparison at the foci of the several objectives, and a screen to receive the projected images of the several objects located at the end of the barrel opposite said lenses, and partitions adapted to be positioned at will within said barrel to separate the light rays from the several objectives, or removable to permit the same to overlap, said partitions extending to a level adjacent the screen, and an extension of thin sheet material adapted to be supported in the plane of said partition, between its edge and the screen.

13. In combination with the barrel of a magnascope, a plurality of objective lenses mounted at one end thereof, a translucent screen at the opposite end, upon which the lenses are focused, means independent of each other for supporting each of several objects, each beneath its own objective, and means distant from the several object supports and operable while viewing the fixed image to adjust any one or all of the object supports in a plane normal to the optical axis of its lens.

14. In combination with the barrel of a magnascope, a plurality of objective lenses, means supporting each lens from the nose of the magnascope barrel for movement independent of the other lenses in a plane normal to the optical axes of the lenses, a translucent screen at the opposite end of the barrel, upon which the lenses are focused, independent means for supporting each of several objects beneath its own objective, partition means disposed within the barrel between the optical axes of the several lenses, and means to displace said partition means without disturbance of a given object or its lens and the screen, whereby, upon movement of another lens, the image of the given object may be viewed alone or in juxtaposition to images of the other objects.

15. The combination of claim 14, and independent means for adjusting each object support in a plane normal to the optical axis of its lens.

16. In combination, a magnascope barrel disposed upon an upright axis, and terminating at about eye level above the floor, an object support beneath the barrel, an objective lens disposed beneath and projecting an image through the barrel, a translucent screen disposed at the upper end of the barrel to fix such image, a mirror angularly disposed above said screen to reflect such image laterally, and means distant from the object support and the objective lens, located for manual operation by an operator while observing the image reflected in the mirror, for relative adjustment of the object support and objective lens.

17. In combination, a magnascope barrel disposed upon an upright axis, and terminating at or about eye level above the floor, a stand supporting said barrel from the floor, an object support beneath the barrel, an objective lens disposed beneath and supported from the lower end of the barrel, above the object support, a translucent screen supported upon the upper end of the barrel, an angularly disposed mirror above said screen, and means distant from the object support located for manual operation by an operator while looking at the image reflected in the mirror, for adjustment of said object support relative to the objective lens.

18. In combination, a magnascope barrel, an object support at one end of the barrel, an objective lens disposed at this end of the barrel to project an image of the object thus supported through the barrel to the opposite end, a screen for fixing the image and a mirror for reflecting the image at an angle to the barrel's axis disposed at the opposite end of the barrel, the barrel being of such length that the object support and objective lens are not within reach of a person viewing the image at the opposite end, and means disposed for operation by a person so viewing the image, for relative adjustment of the object support and objective lens.

19. In combination, a magnascope barrel, an object suport at one end of the barrel, an objective lens disposed at this end of the barrel to project an image of the object thus supported through the barrel to the opposite end, a screen for fixing the image disposed at the opposite end of the barrel, the barrel being of such length that the object support and objective lens are not within reach of a person viewing the image at the opposite end, and means disposed for operation by a person so viewing the image, for relative adjustment of the object support and objective lens.

20. In a comparison camera, a body or enclosure having a plurality of light-transmitting apertures near one end, an image screen disposed near its opposite end, supporting means for a plurality of objects under comparison associated with said apertures, and means adapted to produce images of the objects under comparison on a common area of said screen.

21. In a comparison camera for comparing a plurality of objects, a body member, a lens head and an image screen disposed near opposite ends of the body member, said lens head having spaced apertures therein, a lens for each of said apertures arranged to project images of the several objects, along relatively convergent optical axes, into substantial coincidence on said screen.

22. A comparison camera including adjustable supports for a plurality of objects under comparison, a lens for each of said objects, and an image screen, common to said lenses and objects, the screen and lenses being relatively disposed for normally projecting superimposed images of said several objects under comparison on a common area of said screen.

23. In an apparatus for comparative photography, a camera body, an image screen near one end thereof, a pair of lenses disposed in laterally spaced relation, near the opposite end of the camera body and focused on a common area of said screen, and means disposed between the lenses and screen for intercepting portions of the light rays transmitted through each of said lenses.

24. A comparison camera having spaced apertures near one end, an image screen near its opposite end, lenses adjacent to said apertures focused on a common area of said screen, and a partition between said apertures, extending toward said screen.

25. In a camera for comparative photography, a pair of lenses spaced from each other, an image screen common to said lenses, said lenses having their principal axes intersecting in a point lying substantially in the plane of said screen, and a partition disposed for movement between the lenses and said screen.

26. A comparison camera including adjustable supports for the objects under comparison, an image screen, laterally spaced lenses, each associated with one of the supports, said lenses being disposed so as to have their principal focal axes converge at a point on said screen, and a partition member within the camera, said member lying in the plane which bisects the angle between the principal axes of said lenses.

27. A camera for producing a composite image of a plurality of like objects for purposes of comparison, including a photographic chamber having a plurality of apertures, a screen, lenses for said apertures focused on identical areas of said screen, and an adjustable and removable partition member in said chamber.

28. A comparison camera adapted to produce a composite image of a plurality of objects to be compared, including a focusing screen, a plurality of lenses focused on identical areas of said screen, each of said lenses being correlated with one of the objects, adjustable means for supporting the objects in comparing relation, and means located at a distance from the objects for controlling the movement thereof.

29. An instrument for examining, comparing and photographing objects, including a camera having a pair of laterally spaced photographing apertures and a focusing screen, means for projecting images in super-imposed relation on said screen, axially rotatable stages for positioning a pair of objects before said apertures and means for individually adjusting the position of said stages, apart from their axial rotation.

30. An instrument for examining, comparing and photographing objects, including a camera having a focusing screen, a pair of spaced photographing apertures and lenses associated therewith adapted to produce a sectionalized image on said screen, said lenses being disposed so as to have their principal axes converge at a point on said screen, individually adjustable object supports including means for aligning and rotating a pair of objects before the apertures, and means located at a distance from said supports for controlling the movement thereof.

31. In combination, a camera having a focusing screen and a pair of laterally spaced lensed apertures adapted to project, rectilinearly, a pair of images in superimposed relation on said screen, a pair of stages each correlated with one of said apertures, for supporting objects to be photographed, and means for linearly adjusting the positions of said stages in any direction.

32. In combination with a camera having a screen and a pair of laterally spaced lensed apertures normally focused on a common area of said screen, a partition member in said camera adapted for endwise movement in a plane extending between said apertures, a pair of stages for supporting objects to be examined and photographed, means enabling universal bodily movement of said stages, means for rotating said stages and means for controlling the movement of the stages.

33. In combination with a camera having a focusing screen and a pair of lensed photographic apertures adapted concurrently to project images on identical areas of said screen, an object support including a standard adapted for transverse movement relative to the photographic axis, a rotatable stage adapted for movement axially of the photographic axis on said standard and means for controlling the movements of said standard and stage.

LUKE S. MAY.